United States Patent [19]

Zodrow et al.

[11] 4,450,040
[45] May 22, 1984

[54] NOISEPROOFED LABELING MACHINE

[75] Inventors: Rodolf Zodrow; Rainer Buchholz, both of Düsseldorf, Fed. Rep. of Germany

[73] Assignee: Jagenberg AG, Dusseldorf, Fed. Rep. of Germany

[21] Appl. No.: 349,931

[22] Filed: Feb. 18, 1982

[30] Foreign Application Priority Data

Mar. 27, 1981 [DE] Fed. Rep. of Germany ....... 3112067

[51] Int. Cl.³ .......................... B65C 9/02; F16H 55/14
[52] U.S. Cl. ...................................... 156/567; 74/443; 74/569; 156/568; 156/571; 156/DIG. 25
[58] Field of Search ....... 156/567, 568, 571, DIG. 25, 156/DIG 32; 74/443, 569, 409, 411, 440 DIG. 10

[56] References Cited

U.S. PATENT DOCUMENTS

| 2,307,129 | 1/1943 | Hines et al. | 74/443 |
| 2,816,457 | 12/1957 | Sterzer | 74/569 |
| 2,955,481 | 10/1960 | Jackel | 74/443 |
| 3,667,317 | 6/1972 | Hillingrathner | 74/443 |
| 4,298,422 | 11/1981 | Zodrow | 156/568 |

Primary Examiner—Michael G. Wityshyn
Attorney, Agent, or Firm—Sprung Horn Kramer & Woods

[57] ABSTRACT

In a labeling machine comprising a machine frame (1), a turret (2) in said frame, a concentrically disposed gear (12) carried by said turret for rotation of said turret, a plurality of turntables (3) carried by said turret, a drive (8,9) mounted in the machine frame, a pinion (10) driven by said drive and driving said concentrically disposed gear and turret, an infeed starwheel (4) and an outfeed starwheel (7) each meshing (13,14) with the concentrically disposed gear, and a labeling station (6) driven by a pinion (15) meshing with the turret gear, the improvement which comprises providing each gear (13,14) of the infeed and outfeed starwheels (4,7), of each pinion (10,15) of the drive (8,9) and of the labeling station (6), and any further pinions (18,20) meshing with the gear (12) of the turret (2) and driving, in synchronism with the turret (2), other mechanisms mounted in the machine frame, with a hub (42) a toothed ring (43) and a damping element (41,47–52) between each hub and toothed ring so as to isolate said hub and said toothed ring from each other with respect to solid-borne sound.

8 Claims, 23 Drawing Figures

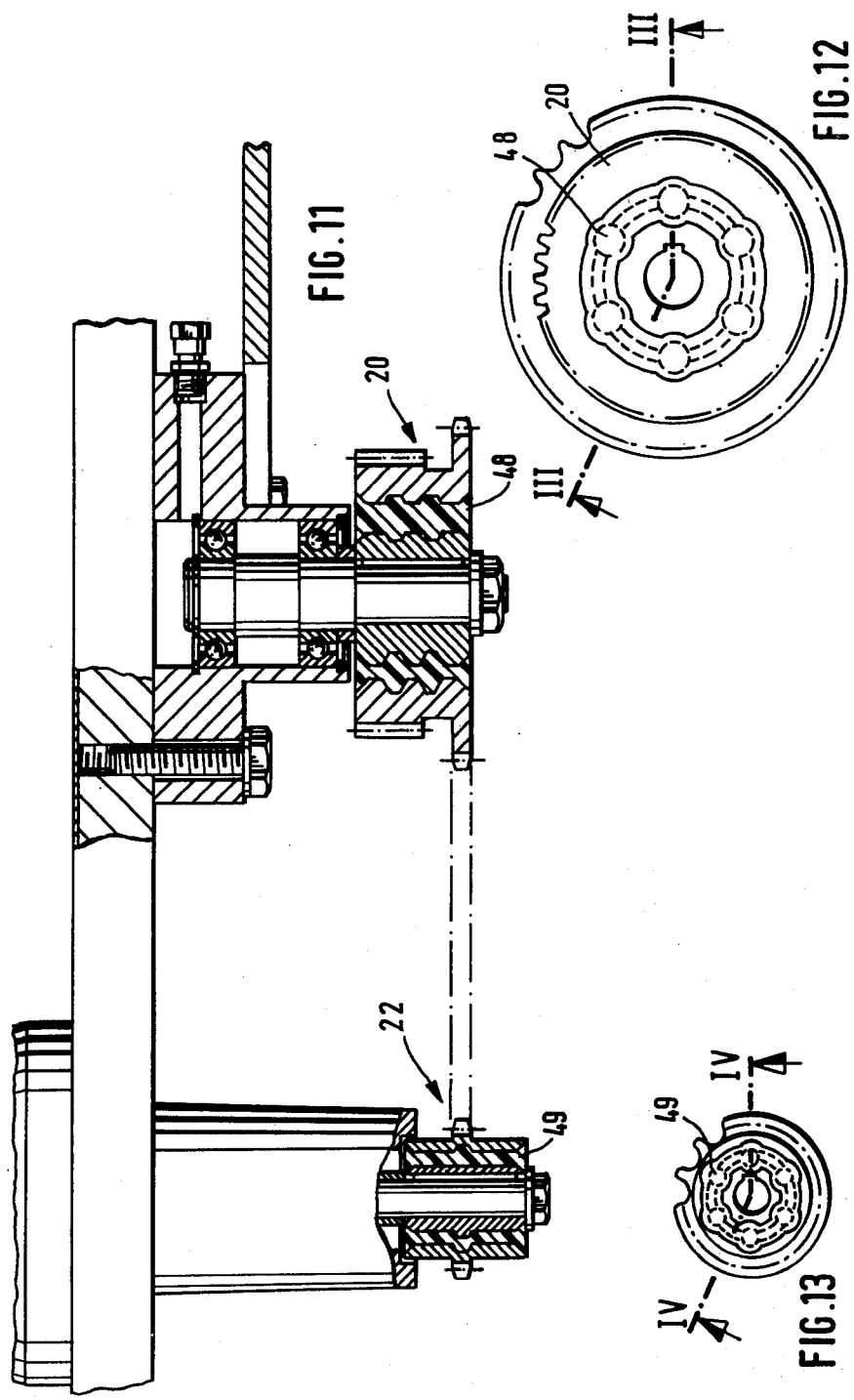

NOISEPROOFED LABELING MACHINE

BACKGROUND OF THE INVENTION

The invention relates to a labeling machine comprising a machine frame and, rotatably mounted therein, a turret which carries a plurality of turntables, and in particular cam-controlled turntables, and comprises a concentrically disposed gear driven by a pinion of a drive mounted in the machine frame; an infeed starwheel and an outfeed starwheel, each of which meshes through a concentrically disposed gear with the turret gear; and a labeling station which is driven by a pinion meshing with the turret gear.

A labeling machine of this type transmits noise from many sources through the machine frame. This noise increases with the production rate. Noise-abatement ordinances have long required that appropriate noise-reduction techniques be employed with machines of all kinds. One way of reducing such noise is to machine meshing gears to close tolerances. Now this entails higher costs, especially in the case of large-diameter gears such as the turret gear, which has a diameter of about 150 cm. Secondary measures such as encapsulation of a noise-radiating machine have gained acceptance only where access to the machine is rarely required while it is in operation. Such an approach would not be suited for a labeling machine.

SUMMARY OF THE INVENTION

The invention has as its object to provide a labeling machine whose noise level is much lower than that of conventional labeling machines.

In accordance with the invention, this object is accomplished by providing a damping element between the hub and the toothed ring of each gear of the infeed and outfeed star-wheels, of each pinion of the drive and of the labeling station, and of any further pinions meshing with the turret gear and driving, in synchronism with the turret, other mechanisms mounted on the machine frame, such as a tacho generator, spacer worm, etc., in order to isolate the hub and the toothed ring from each other with respect to solid-borne sound.

The measures in accordance with the invention are primary measures designed to suppress the generation of solid-borne, or structurally transmitted, sound. They are cheaper to implement and interfere less with the operation of the machine than secondary measures (such as encapsulation of the machine) and have the further advantage of compensating for the tolerances of meshing gears or cam mechanisms and protecting the drives against shock loads in starting and stopping the machine.

In principle, isolation with respect to solid-borne sound might be provided through a damping element also in the gear of the turret. However, it has been found that incorporating such measures in the gears meshing with the turret gear is sufficient since they compensate for the production tolerances of the meshing gears, which is what accounts for the noise.

When the turret is equipped with cam-controlled turntables which individually engage, through a lever arm, a groove in a stationary cam member, an appropriate primary measure applicable to the cam groove and lever arm as a source of noise might be to support the cam member on supports provided with damping elements, with the latter isolating the part of the supports fixed to the machine frame from the part of the supports secured to the cam member, with respect to solid-borne sound, and to have the lever arm guided in the cam groove through a roller or a pair of rollers, each roller then being provided with a damping member between its hub and its shell in order to isolate these two parts from each other with respect to solid-borne sound.

While in the case of the turret the meshing gears are exposed and would radiate sound if the measures described were not adopted, in the labeling station the points of contact of gears and cam mechanisms are usually housed in a closed transmission case with oil-bath lubrication. And since the meshing gears there are very much smaller than the gear of the turret or of the infeed and outfeed starwheels, they can be machined with high precision. The labeling station therefore accounts for but a small fraction of the structurally transmitted sound, and there is no need to provide damping at all points of contact. When the labeling machine comprises pickup members which are rotatably mounted on a carrier driven by the pinion and which are provided with lever arms carrying rollers, or with planet gears, and the lever arms engage a groove in a stationary cam member or the planet gear meshes with a stationary toothed member, the source of noise constituted by lever arm/cam groove or planet gear/teeth may be isolated by mounting the member provided with a groove or with teeth on the machine frame solely through a damping element which introduces a discontinuity in the structural transmission path between said member and the machine frame. In addition to this isolation on one side, there is provided on the other side a damping element between the hub and the toothed ring or the shell of the roller of the lever arm to isolate them from each other with respect to solid-borne sound.

When the infeed starwheel is proceded by a spacer worm which comprises a drive shaft mounted in the machine frame and provided with a pinion or a sprocket wheel that is driven by the pinion meshing with the turret gear, a further source of noise is present. This can be isolated from the machine frame by providing the pinion or sprocket wheel with a damping element between the hub and the toothed ring or sprocket ring to isolate these two parts from each other with respect to solid-borne sound.

The damping element in the gears, pinions, sprocket wheels, rollers or the like preferably has the basic form of a sleeve which constitutes the sole connecting member between hub and toothed ring, sprocket ring or shell, respectively. Since bonding the two parts together usually is not sufficient for the transmission of torques, there are provided, in accordance with one feature of the invention, axially extending enlargements or constrictions at one or more points staggered along the circumference. Thus interlocked, the parts are capable of transmitting the torques.

The damping element disposed between the parts of the supports, or between the labeling-station member provided with a toothed ring or a cam groove and the machine frame, has the basic form of a disk, and more particularly of an annular disk, which constitutes the sole connecting member between the parts of the supports or between said member and the machine frame. To increase the rigidity of the damping element in the plane of the disk, annular grooves may be provided in the facing sides of the parts to be joined together. This may be done also in the case of the gears, pinions, sprocket wheels or rollers, respectively, to increase their axial rigidity.

Since in the case of rotating parts such as pinions, gears or rollers and the associated stationary gears and cams with which said pinions, gears or rollers are in contact maximum precision and freedom from backlash or play, respectively, between the two parts in contact are a requirement and this requirement is difficult to satisfy with resilient damping elements, the space between the two components to be joined together is, in accordance with one feature of the invention, filled with a material which passes from a castable state to a resilient state with shrinkage, the inner walls bounding said space having beveled regions so that the material while shrinking is pulled against said beveled regions centered, in the manner of a chucking cone or wedge. With this feature of the invention, the material acts on the principle of a rivet with two heads which are pulled against the beveled edges of the two parts and which will center the two parts even when the shank of the rivet is not in contact with the walls of the bore in the two parts. Thus, in the invention the shrinkage of the material connecting the two parts, which normally would have an adverse effect on the alignment of two parts being joined, is taken advantage of to effect centering. A damping element of this type can readily be produced and provides the desired freedom from backlash or play as well as tolerance compensation.

BRIEF DESCRIPTION OF THE DRAWINGS

The invention will now be described in greater detail with reference to the accompanying drawing which illustrates an embodiment and wherein:

FIG. 5 is a top plan view of a pinion from the drive of the labeling machine;

FIG. 11 is a side elevation of and fragmentary axial section through the drive of the spacer worm;

FIG. 12 is a top plan view of the combined pinion and sprocket wheel of the drive of the spacer worm of FIG. 11;

FIG. 13 is a top plan view of the sprocket wheel of the drive of the spacer worm of FIG. 11;

DETAILED DESCRIPTION OF THE INVENTION

Figure 1:
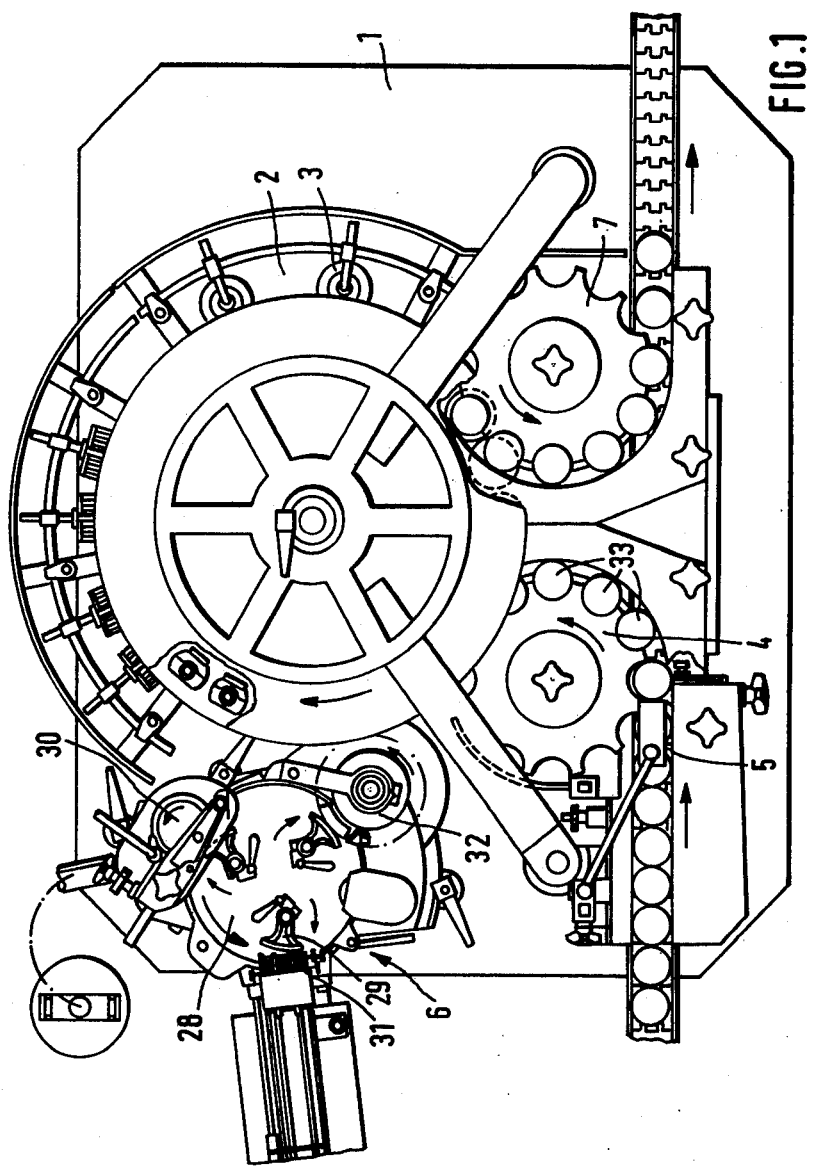
FIG. 1 is a top plan view of a labeling machine.
Figure 2:
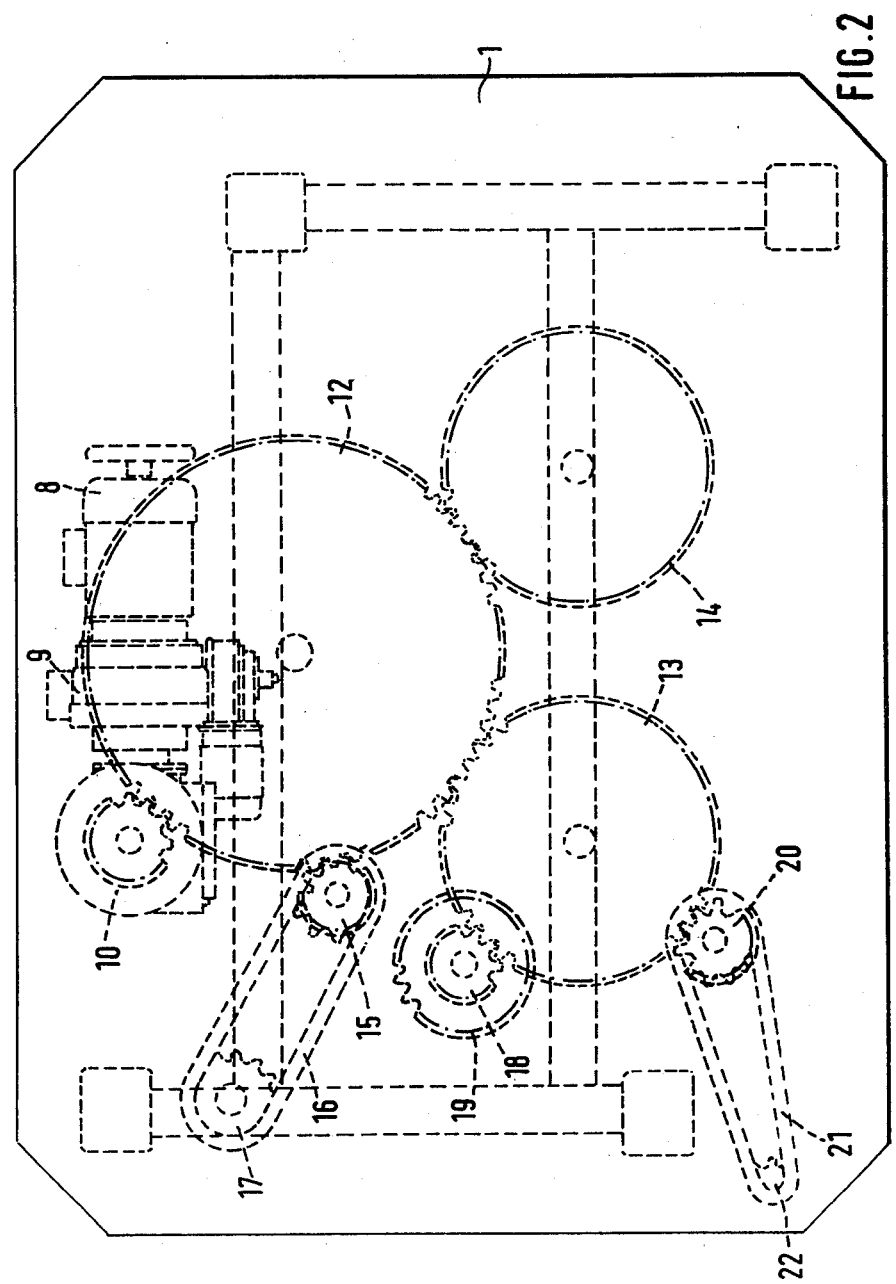
FIG. 2 is a top plan view of the drive of the labeling machine of FIG. 1.

The labeing machine shown in FIG. 1 comprises a machine frame 1, a turret 2 with a plurality of cam-controlled turntables 3, an infeed starwheel 4 preceded by a spacer worm 5, a labeling station 6, and an outfeed starwheel 7. Turret 2, infeed starwheel 4, spacer worm 5, labeling station 6, and outfeed starwheel 7 are mounted in the machine frame 1. The drive consists of an electric motor 8 with a gear box 9. A drive pinion 10 of the drive 8 and 9 drives a large gear 12 mounted on a shaft 11 of the turret 2. Said gear 12 drives, directly or indirectly, other mechanisms of the labeling machine which must be driven in synchronism therewith. Directly in mesh with the gear 12 are a gear 13 of the infeed starwheel 4 and a gear 14 of the outfeed starwheel 7 as well as a pinion 15 for the labeling station. The pinion 15 is connected to a drive wheel 17 of the labeling station 6 through a cogged belt 16. The gear 13 of the infeed starwheel 4 is in mesh with a pinion 18 of a larger gear or sprocket wheel 19 and with a pinion 20 which through a chain 21 is connected to a sprocket wheel 22 of a drive shaft for the spacer worm 5. As the turret 2 revolves, the turntables 3 on said turret are angularly displaced in confirmity with the pattern of a cam groove 24 by a lever arm 23 which is guided in said groove 24, disposed in a platelike cam member 25. The lever arm 23 carries a pair of rollers 26 as cam followers. The cam member 25 is supported on the machine frame 1 by means of a plurality of supports 27.

Figure 19:
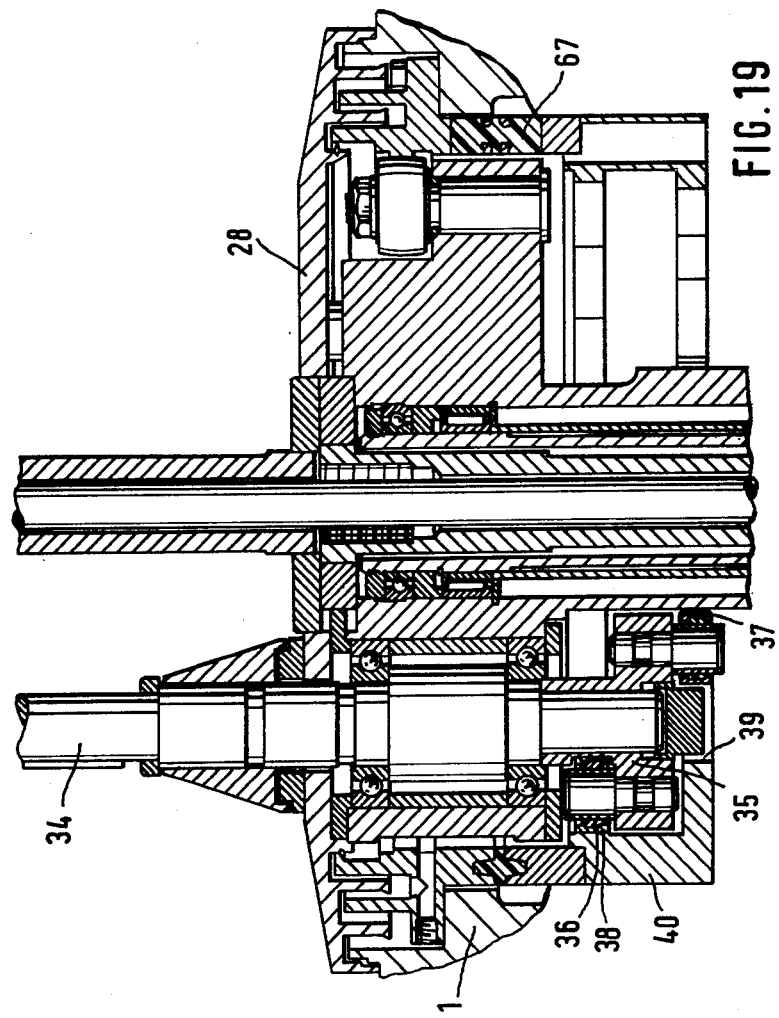
FIG. 19 is a portion of a labeling station, shown in an axial section through the labeling machine of FIG. 1.

The labeling station 6 is provided on a revolving carrier 28 with a plurality of rotating pickup members 29 which after being glue-coated at a glue roll 30 pick up a label from a stack 31 of labels and transfer it to a gripper cylinder 32 which then applies it to one of the bottles 33 being moved past it on the turret 2. The rotary motion of the pickup members 29 is imparted to them by a planetary gear train. Said pickup members are connected through a shaft 34 to a planet gear 35 which carries an upper set of rollers 36 and a lower set of rollers 37. Said rollers are arranged in a circle, each pair engaging an upper and a lower inner groove 38 and 39, respectively, in a stationary cam member 40 (FIG. 19).

A number of primary measures are adopted to prevent the various sources of noise in the drives for the various mechanisms from transmitting the noise through the machine frame.

Figure 3:
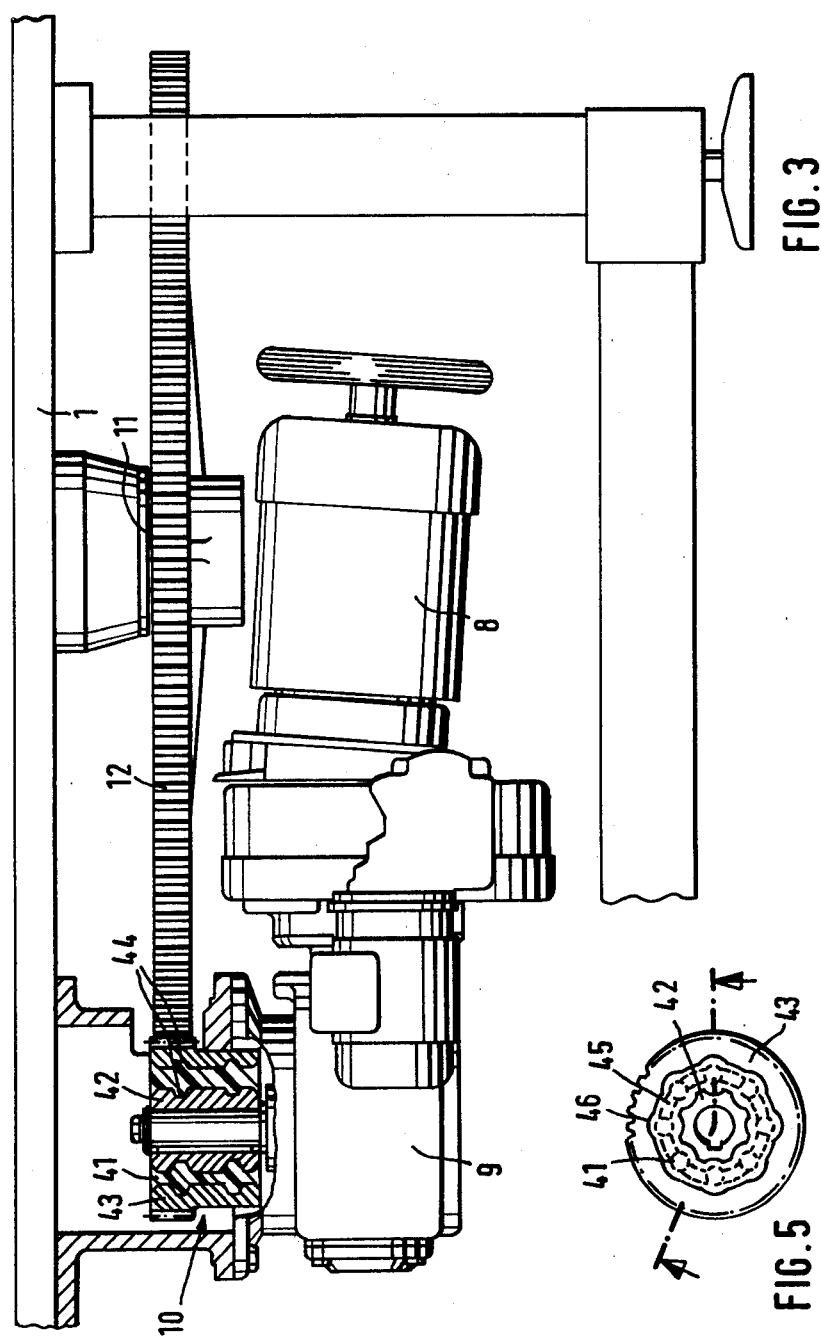
FIG. 3 is a side elevation and fragmentary axial section of the lower part of the turret of the labeling machine of FIG. 1.

As shown in FIGS. 3 and 5, the drive pinion 10 of the drive 8 and 9 is provided with a damping element 41 between the hub 42 and the outer part 43 carrying the toothed ring. The damping element 41 is the sole connecting member between the inner and outer parts 42 and 43. Facing annular grooves 44 of trapezoidal cross section are machined into the cylindrical inside of the outer part 43 and the cylindrical outside of the inner part 42. Moreover, the edges are beveled. As is apparent from the drawing, the inside diameter is not constant in the circumferential direction. There are regions 45 of small radial width which make it possible to maintain high dimensional accuracy in the concentricity of the outer and inner parts 42 and 43, and regions 46 which are enlarged relative thereto and produce interlocking in the circumferential direction. The grooves 44 and the beveled edges provide high axial rigidity and in conjunction with the sloping sides of the grooves give rise to a stressing of the two parts 42 and 43 by the damping element which has the effect of centering them. This centering action is due to the fact that in the axial direction the regions of smaller inside diameter draw the regions of larger inside diameter against the sloping sides or the beveled edges, respectively, in the manner of a double-headed rivet. The centering effect would be preserved even if the regions of smaller inside diameter should become detached from the adjacent walls. This is the case not only in the axial direction but, because of the enlarged regions 46, also in the circumferential direction.

The construction of the gears 13 and 14 of the infeed and outfeed starwheels 4 and 7, of the pinion 15 of the labeling station 6, of the tacho-generator pinion 18, and of the pinion 20 and the sprocket wheel 22 is the same as that of the pinion 10 so far as the damping elements 47 to 52 are concerned. As is apparent from the figures, the rolls 26 are constructed similarly.

Figure 4:
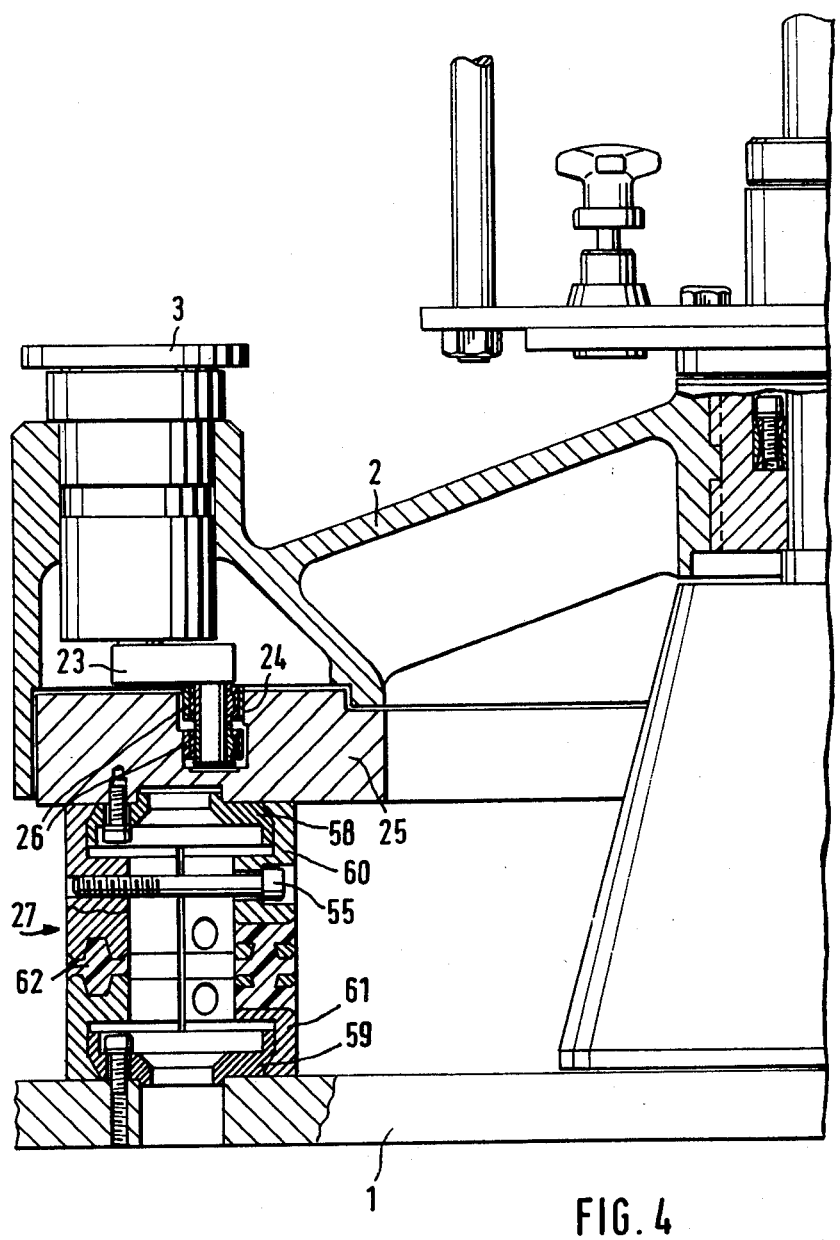
FIG. 4 is one-half of an axial section through the upper part of the turret of the labeling machine of FIG. 1.
Figure 6:
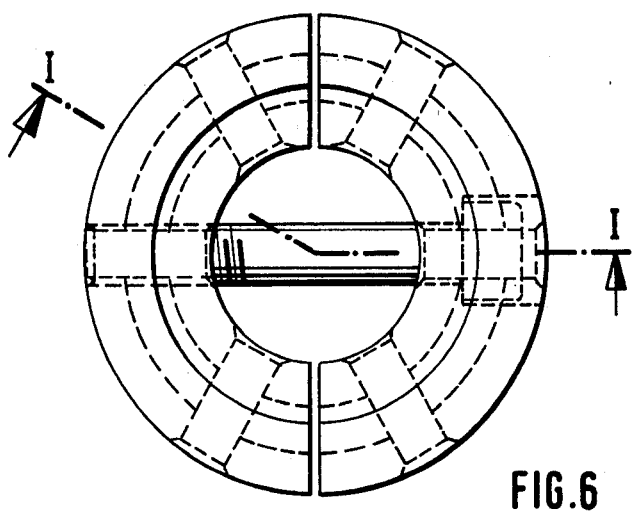
FIG. 6 is a top plan view of a support for the cam plate of the turret shown in FIG. 4.
Figure 7:
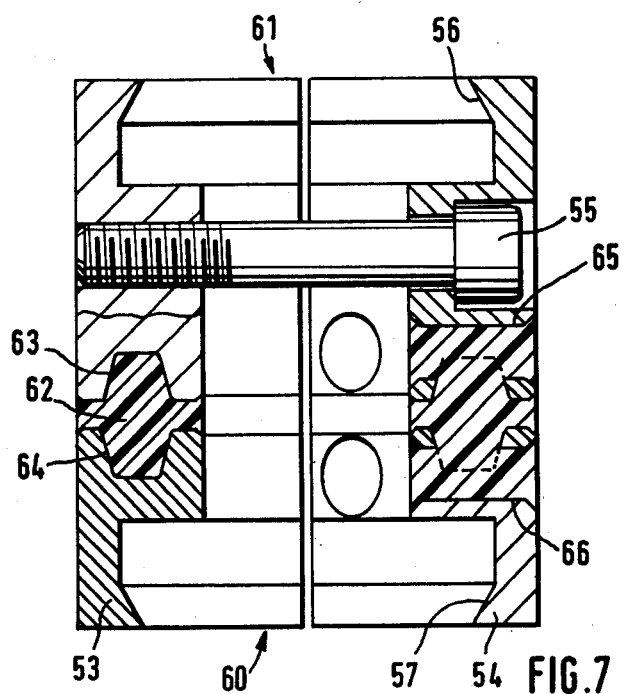
FIG. 7 is an axial section through the support of FIG. 6, taken along the line I—I in FIG. 6.
Figure 8:
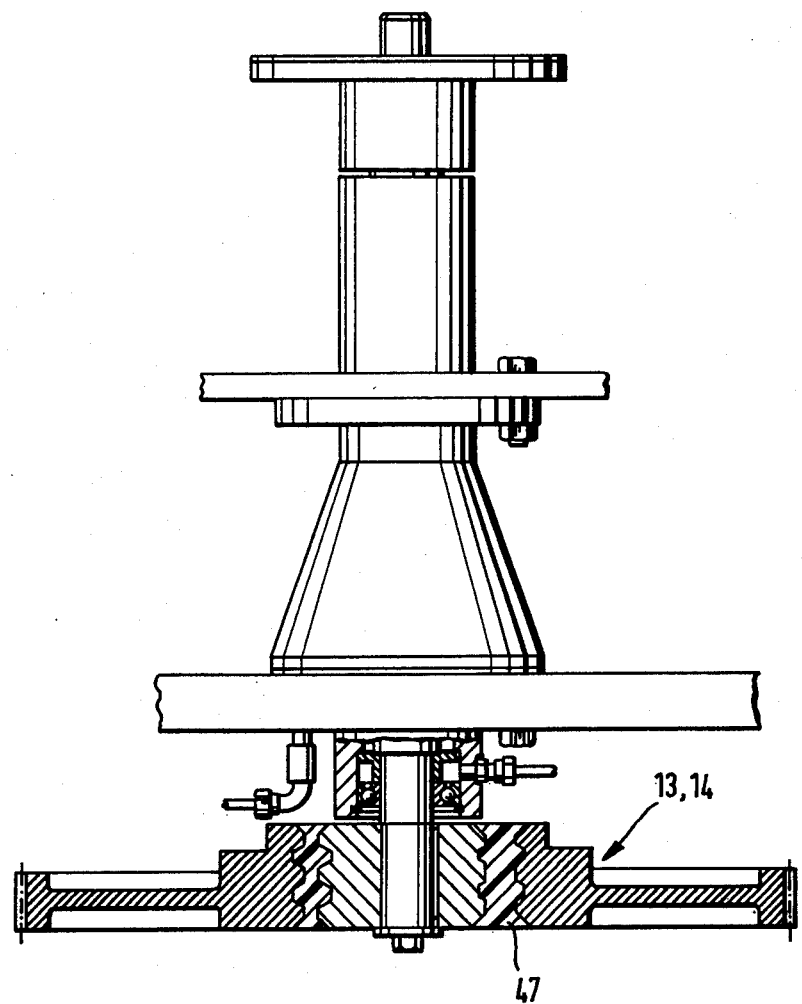
FIG. 8 is a side elevation of and fragmentary axial section through the lower part of the infeed or outfeed starwheel of the labeling machine of FIG. 1.
Figure 9:
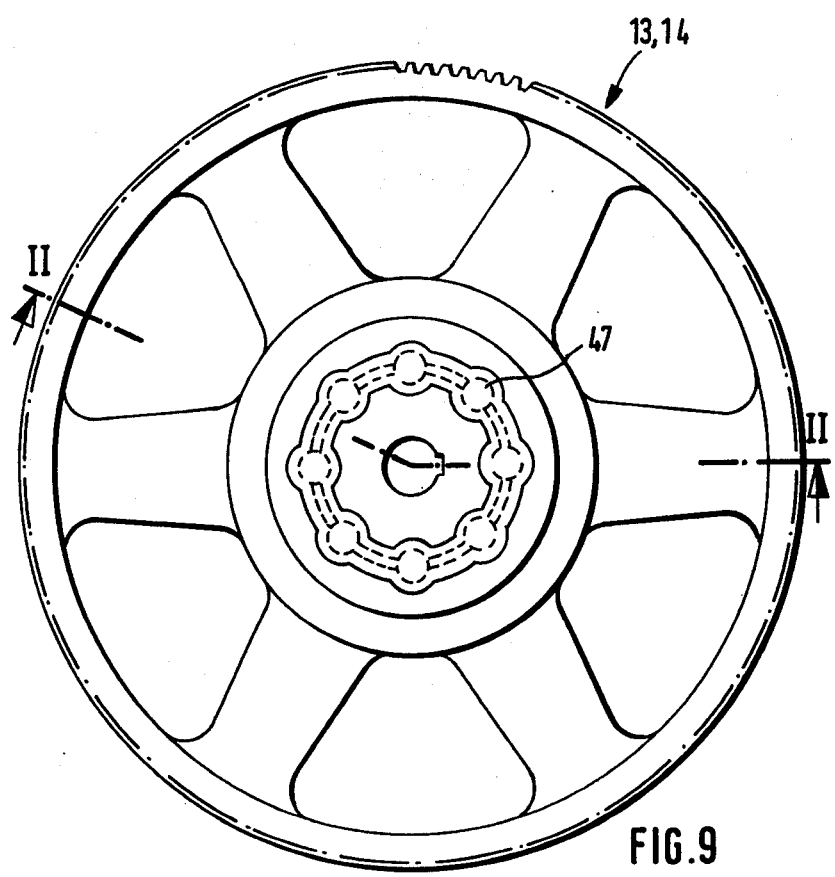
FIG. 9 is a top plan view of the gear of the infeed or outfeed starwheel of FIG. 8.
Figure 10:
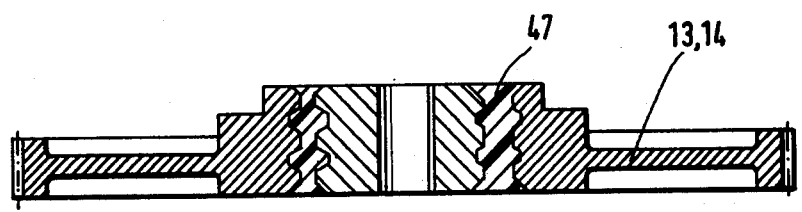
FIG. 10 is a section through the gear of FIG. 9, taken along the line II—II in FIG. 9.
Figure 14:
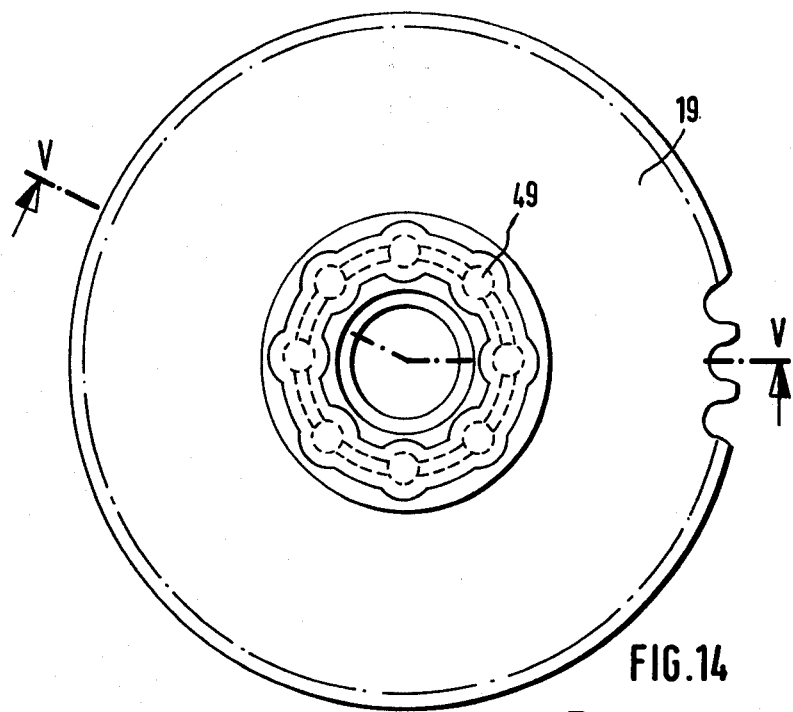
FIG. 14 is a top plan view of the pinion for a tacho generator for a labeling machine according to FIG. 1.
Figure 15:
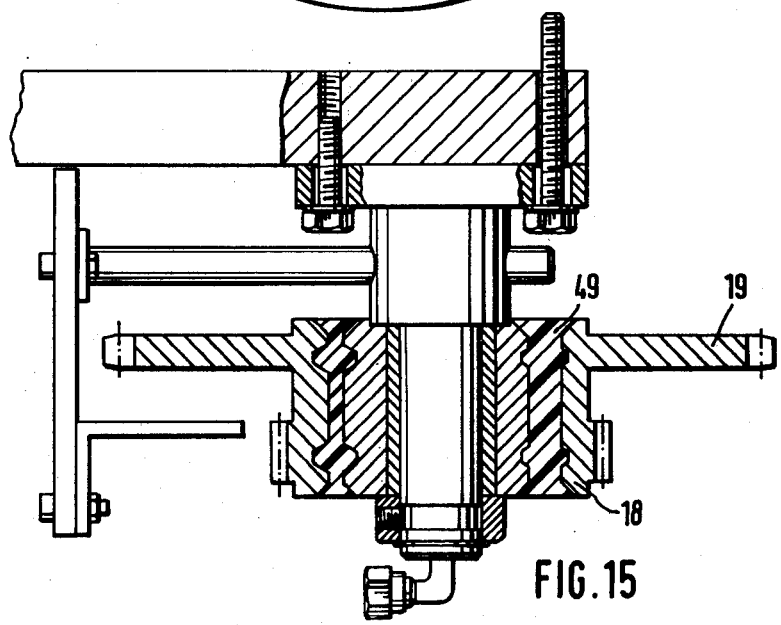
FIG. 15 is an axial section through the pinion of FIG. 14, taken along the line V—V in FIG. 14.
Figure 16:
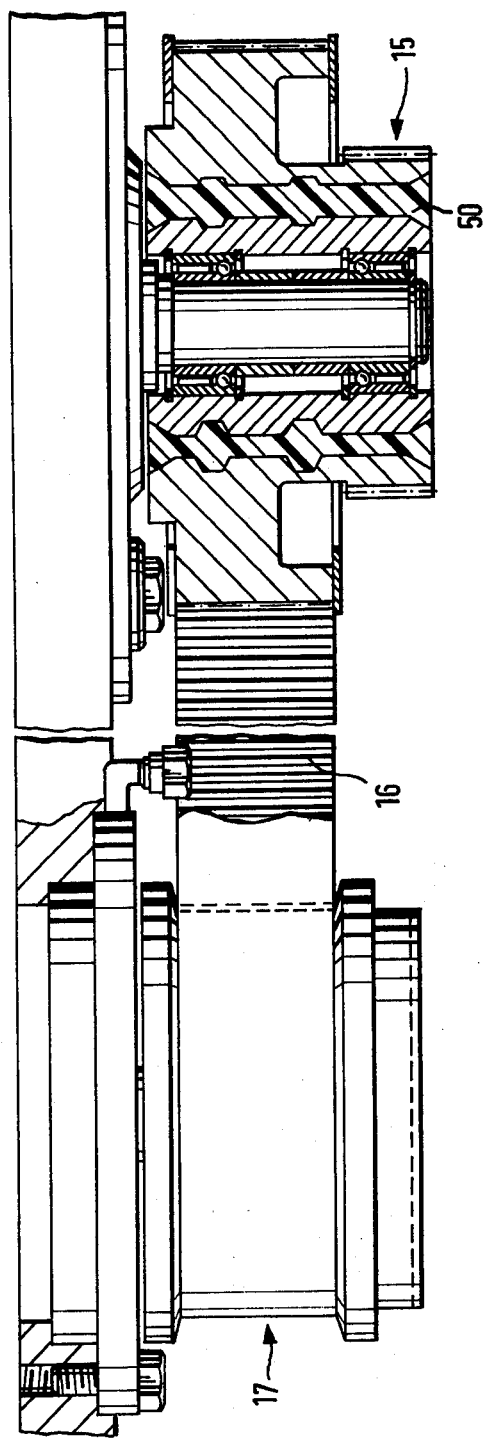
FIG. 16 is a side elevation of and fragmentary axial section through the drive of the labeling station of the labeling machine of FIG. 1.
Figure 17:
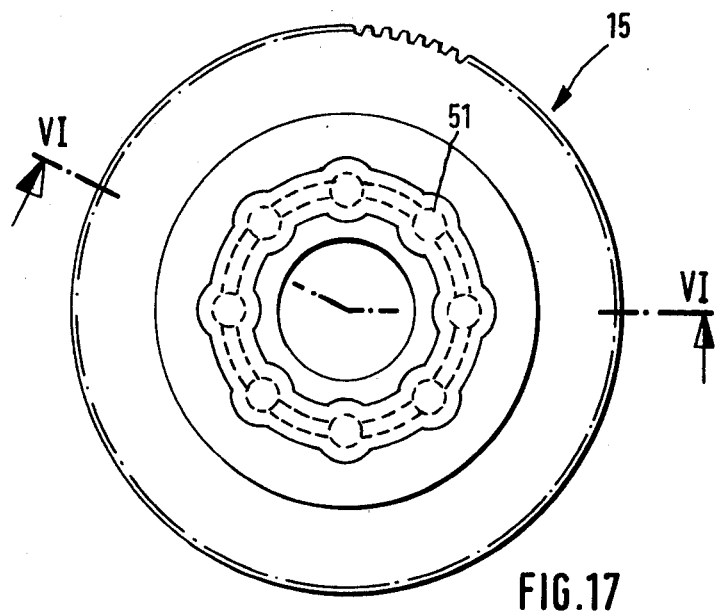
FIG. 17 is a top plan view of the drive pinion of the labeling station of FIG. 16.
Figure 18:
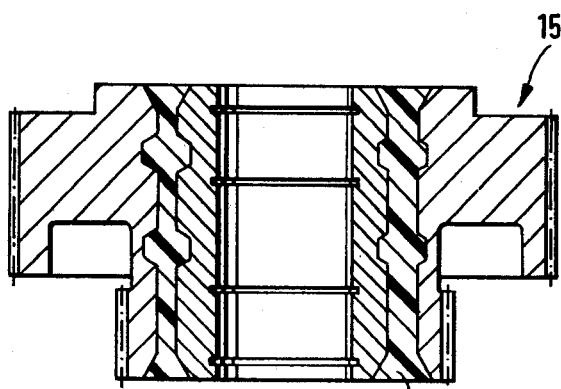
FIG. 18 is an axial section through the drive pinion of FIG. 17, taken along the line VI—VI in FIG. 17.

The support 27 in the embodiment according to FIGS. 4, 6 and 7 has the shape of a sleeve and is axially divided into two halves 53 and 54 which are held together by a transversely extending threaded bolt 55. The support 27 comprises at top and bottom a circular collar 56 and 57, respectively, with conical inner annular surfaces which serve for the tightening of the support 27 on the machine frame 1 and the cam member 25 by the use of disks 58 and 59, respectively, which have corresponding conical outer surfaces. Moreover, the support 27 is divided transversely. The upper part 60 and the lower part 61 are connected through an annular, disklike damping element 62. To permit interlocking of the upper and lower parts 60 and 61, grooves 63 and 64 having a trapezoidal cross section are provided in the opposed end faces of these parts. Said grooves 63 and 64 are intersected by a plurality of radial bores 65 and 66 which are filled with the material of the damping element 62. The edges of said bores and of the end faces of the two parts 60 and 61 are outwardly beveled, as is apparent from the drawing. The material in the bores 65 and 66 and in the space between the end faces of the two parts 60 and 61 is cast as one piece. The material lodged in the bores 65 and 66 serves as a tie rod for the damping element 62, which constitutes the sole connection between the two parts 60 and 61.

Figure 20:
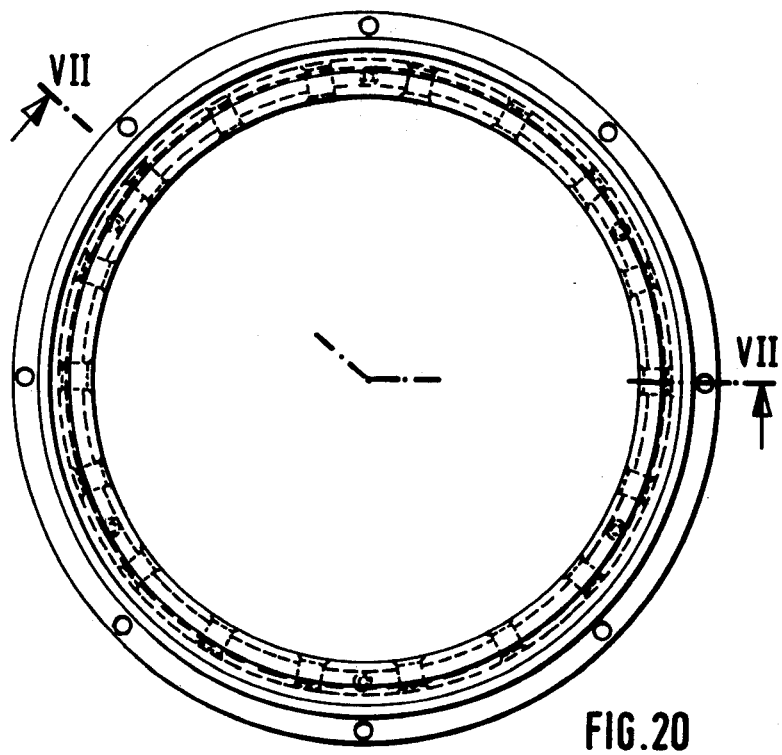
FIG. 20 is a top plan view of a toothed or sprocket ring of the labeling station of FIG. 19.
Figure 21:
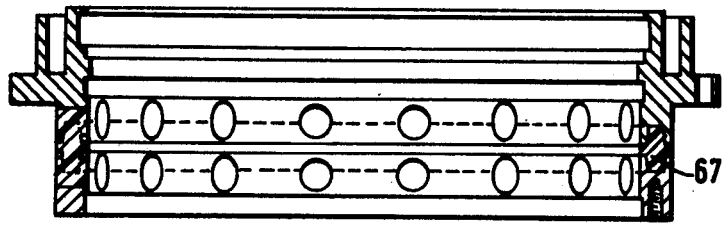
FIG. 21 is an axial section through the ring of FIG. 20, taken along the line VII—VII in FIG. 20.
Figure 22:
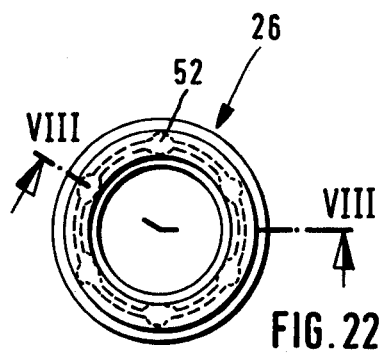
FIG. 22 is a top plan view of a roller for a lever arm of the turntables of the turret according to FIG. 4 or for the planet gears of the pickup members of the labeling station of FIG. 19.
Figure 23:
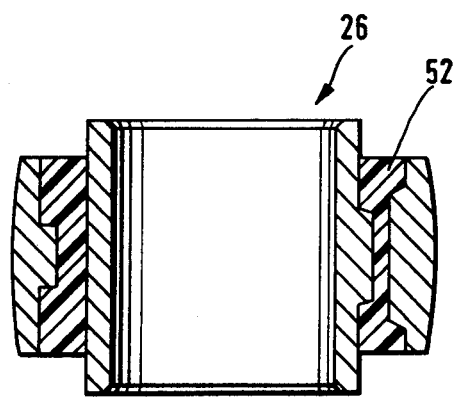
FIG. 23 is an axial section through the roller of FIG. 22, taken along the line VIII—VIII in FIG. 22.

In the labeling station according to FIGS. 19 to 21, the cam member 40 is secured to the housing of the labeling station 6, which forms a part of the machine frame 1 of the labeling machine, through a correspondingly constructed annular damping element 67.

To produce the damping elements 41, 47 to 53, 62 and 67, the two parts to be joined are first positioned as desired relative to each other. Then the space between them is filled with a castable material which shrinks as it passes to the resilient state. In conjunction with the beveled surfaces at various points in the space between the two parts, the shrinkage of said material causes the wedgelike or conical portion of the castable material to pull up against said beveled surfaces as the material solidifies, thus producing a stress which assures freedom from backlash or play and maximum precision even if the material should lift off the parallel wall surfaces. While in concentrically superposed parts the stress is produced in the axial direction, in the case of parts to be joined by their end faces it is in a direction normal to said end faces.

In the embodiment of FIGS. 6 and 7, the material is drawn into the grooves 63 and 64, with the material poured into the bores 65 and 66 acting as a tie rod.

Since in this labeling machine the sources of noise are isolated from the machine frame through primary measures, the amount of noise generated here is considerably less than what it is in conventional labeling machines lacking such measures, and this is accomplished at a fraction of the expense secondary measures would entail. These primary measures offer the further advantage that they extend the service life of the drives since tolerances are balanced out and the resilient damping elements also cushion shocks in starting and stopping the machine.

It will be appreciated that the instant specification and claims are set forth by way of illustration and not of limitation, and that various changes and modifications may be made without departing from the spirit and scope of the present invention.

What is claimed is:

1. In a labeling machine comprising a machine frame, a turret in said frame, a concentrically disposed gear carried by said turret for rotation of said turret, a plurality of turntables carried by said turret, a drive mounted in the machine frame, a pinion driven by said drive and driving said concentrically disposed gear and turret, an infeed starwheel and an outfeed starwheel each meshing with the concentrically disposed gear, and a labeling station driven by a pinion meshing with the turret gear, the improvement which comprises providing each gear of the infeed and outfeed starwheels, of each pinion of the drive and of the labeling station, and any further pinions meshing with the gear of the turret and driving, in synchronism with the turret, other mechanisms mounted in the machine frame, with a hub, a toothed ring and a polyurethane elastomer damping element between each hub and toothed ring so as to isolate said hub and said toothed ring from each other with respect to solid-borne sound, each toothed ring and hub having beveled regions bounding the space between them, each damping element having been formed by temporarily surrounding the space with a collar to form a closed space, casting into said space a polyurethane-forming material which sets to an elastomer with shrinkage, allowing the material to set so that in shrinking the elastomer in at least one point is drawn against the beveled regions so as to center itself in the manner of a chucking cone, thereby constituting the damping connection, and removing the temporary collar.

2. A labeling machine according to claim 1, including cam-controlled turntables, each having a lever arm through which it engages a groove in a stationary cam member, said cam being carried by supports provided with damping elements which isolate the part of the support fixed to the machine frame and the part of the support secured to the cam from each other with respect to solid-borne sound, and the lever arm being guided in the cam groove through a roller or a pair of rollers which, between their hubs and their shells, are provided with a damping element to isolate hub and shell from each other with respect to solid-borne sound.

3. A labeling machine according to claim 2, wherein the damping element disposed between the two support parts and the machine frame constitutes the sole connection between the supports parts and the machine frame.

4. A labeling machine according to claim 1, wherein the labeling station includes pickup members mounted on a carrier driven by a pinion, the pickup members through a lever arm fitted with a roller or with rollers following a groove in a stationary cam member or mesh, through a planet gear, with the teeth of a stationary toothed member, the member provided with the groove or the teeth being mounted on the machine frame solely by means of a damping element which isolates said member and the machine frame from each other with respect to solid-borne sound.

5. A labeling machine according to claim 4, wherein the damping element disposed between the member provided with a toothed ring or a cam groove and the machine frame constitutes the sole connection between the member and the machine frame.

6. A labeling machine according to claim 1, including a spacer worm comprising a drive shaft mounted in the machine frame and carrying a pinion or a sprocket wheel that is driven by a pinion meshing with the turret gear, said first pinion or sprocket wheel being provided between its hub and its toothed ring or sprocket ring with a damping element to isolate said parts from each other with respect to solid-borne sound.

7. A labeling machine according to claim 1, wherein the damping element in the gears, pinions, sprocket wheels and rollers is in the form of a sleeve which constitutes the sole connection between hub and toothed ring, sprocket ring or shell.

8. A labeling machine according to claim 1, wherein annular grooves for the damping element are provided in the facing end surfaces of the parts to be joined together.

* * * * *